US006577377B2

(12) United States Patent
Yang

(10) Patent No.: US 6,577,377 B2
(45) Date of Patent: Jun. 10, 2003

(54) POSITION DETECTION DEVICE FOR ILLUMINATION CASE

(76) Inventor: Fanmo Yang, Room D, E & F, 11th Floor, East Tower Tianxing Building, No. 21, Zhongshan 1 Road, Guangzhou (CN)

( * ) Notice: Subject to any disclaimer, the term of this patent is extended or adjusted under 35 U.S.C. 154(b) by 0 days.

(21) Appl. No.: 10/002,082

(22) Filed: Nov. 1, 2001

(65) Prior Publication Data

US 2002/0097381 A1 Jul. 25, 2002

(30) Foreign Application Priority Data

Jan. 21, 2001 (CN) ........................................ 1215039 A

(51) Int. Cl.[7] ................................................ G03B 21/00
(52) U.S. Cl. ...................................................... 352/129
(58) Field of Search ............................. 352/87, 85, 82, 352/91 R, 129; 353/46, 95, 74, 75; 359/446, 449

(56) References Cited

U.S. PATENT DOCUMENTS 4,235,553 A * 11/1980 Gall ........................... 366/208
4,333,715 A * 6/1982 Brooks ........................ 352/98

* cited by examiner

*Primary Examiner*—Russell Adams
*Assistant Examiner*—D. Ben Esplin
(74) *Attorney, Agent, or Firm*—Intellectual Property Law Group LLP; Otto O. Lee; Juneko C. Jackson

(57) ABSTRACT

A position detection device for an illumination case is disclosed. It includes an illumination filmstrip, a grating plate, a transparent back plate, two step motors for driving the grating plate to move up and down, two sensors and a set of sensing elements, and a one-chip microcomputer. The illumination filmstrip overlays the transparent back plate and is fixed against it. The grating plate spreads out and nestles up to the illumination filmstrip by means of one or more stretch springs, and it links with the two step motors. The two sensors are fixed on the left side and the right side of the transparent back plate, respectively. The sensing elements are fitted on the grating plate corresponding to the sensors to set the starting point of the circular up-and-down movement of the grating plate. The current fixed position of the sensing element on the grating plate is taken as the benchmark, and the sensors detect a reference signal. Once the benchmark shifts, the sensors will detect a deviation signal, which will be transmitted to the one-chip microcomputer for processing. By automatically regulating the step motor on the same side, the starting point of the grating plate returns to the preset location. The grating plate keeps an accurate starting point of the circular movement, so that a double image is eliminated on displayed pictures.

7 Claims, 4 Drawing Sheets

POSITION DETECTION DEVICE FOR ILLUMINATION CASE

BACKGROUND

The present invention relates to a position detection device, and it especially relates to the position detection device that is used to locate the starting point of a circular, back and forth movement of the grating plate in the illumination case.

A Chinese Patent No. ZL00227988.6 discloses an illumination case that mainly includes a grating plate, an illumination filmstrip that contains multiple striped pictures, a transparent back plate, and a set of two step motors. The illumination filmstrip overlays the transparent back plate and is fixed against it. The grating plate spreads out and nestles up to the illumination filmstrip by means of stretch springs. The grating plate moves up and down in a circular fashion, and it is driven by the two step motors. With the movement of the illumination filmstrip relative to the grating plate, different striped pictures on the illumination filmstrip are displayed one by one, which causes a sensation to one viewing the pictures that the pictures are changing or moving. Because all of the striped pictures are displayed by means of the back-and-forth movement of the grating plate, in order to show the pictures clearly, the grating plate requires an accurate starting point of the circular movement and an accurate motion distance. This illumination case uses, as the benchmark, a mechanical position switch which the step motor touches when the motor changes its direction and moves downward. Many factors cause the grating plate to deviate from the benchmark during its movement, such as the nonlinear deviation in the motor's movement and the thermal deformation of the illumination filmstrip, the grating plate and the transparent back plate. Although the control circuit of the step motors contains a timing regulation feature, the action sensitivity of the mechanical position switch is low, with a certain progressive error of the contacts causing low control precision. As a result, oftentimes elements of another picture appear in the displayed picture, resulting in a double-imaging in the displayed picture that reduces the clarity of the picture.

There is a need to provide a position detection device that accurately controls the starting point of the grating plate in its circular, up-and-down movement.

SUMMARY

To realize the above object, the position detection device for illumination case of the present invention includes an illumination filmstrip, a grating plate, a transparent back plate, a set of two step motors for driving the grating plate to move up and down, and a one-chip microcomputer. The illumination filmstrip overlays the transparent back plate and is fixed against it. The grating plate spreads out and nestles up to the illumination filmstrip by means of stretch springs, and it links with the two step motors. The position detection device for illumination case of the present invention also includes two sensors and related sensing elements. These two sensors are fixed on the left side and the right side of the transparent back plate, respectively. The sensing elements are correspondingly fitted on the grating plate to set the starting point of the circular up-and-down movement of the grating plate. The current fixed position of the sensing element on the grating plate is taken as the benchmark, and the sensor now detects a reference signal. Once the starting point of the grating plate shifts, the benchmark also shifts accordingly, and the sensor detects a deviation signal, which is transmitted to the one-chip microcomputer for processing. By regulating the step motor on the same side of the grating plate, the starting point of the grating plate is led back to the preset location.

On the fixed position of each of the sensors and each of the sensing elements described in the present invention, a magnetic piece is correspondingly fitted to attract each other, to prevent the sensing elements and the sensors from separating far from each other, which would result in detection error.

The sensors described in the present invention can be infrared photoelectric sensors, supersonic sensors, or magnetic sensors; correspondingly, the sensing elements can be light reflecting chips, sound reflecting chips, or magnetic inductive chips.

In another embodiment of the present invention, an external display circuit is connected to the one-chip microcomputer, which includes a drive module for a seven-segment digital LED and three seven-segment digital LEDs. Instructions are input through the external buttons, and the one-chip microcomputer sets and controls the remaining time, the moving speed, and the moving step-distance of the grating plate. The actual data are displayed on the seven-segment LEDs. The one-chip microcomputer can output at least two synchronous control signals for controlling the synchronous operation of two or more grating plates of the illumination case.

Because of the use of the sensors, the detection of the benchmark of the grating plate is carried out after each moving circle. The detected data are processed by the one-chip microcomputer and are used to regulate the step motor to ensure the accurate positioning of the benchmark. Instructions can be input through the external buttons, and the one-chip microcomputer accordingly sets and controls the grating plate for its remaining time, moving speed, and moving step-distance, so that the grating plate keeps an accurate starting point of the circular movement and accurate moving distance. As a result, the double-imaging is eliminated on the displayed picture.

DESCRIPTION OF DRAWINGS

The present invention will be described in greater details below with reference to the practical examples and attached drawings.

DETAILED DESCRIPTION

Figure 1:
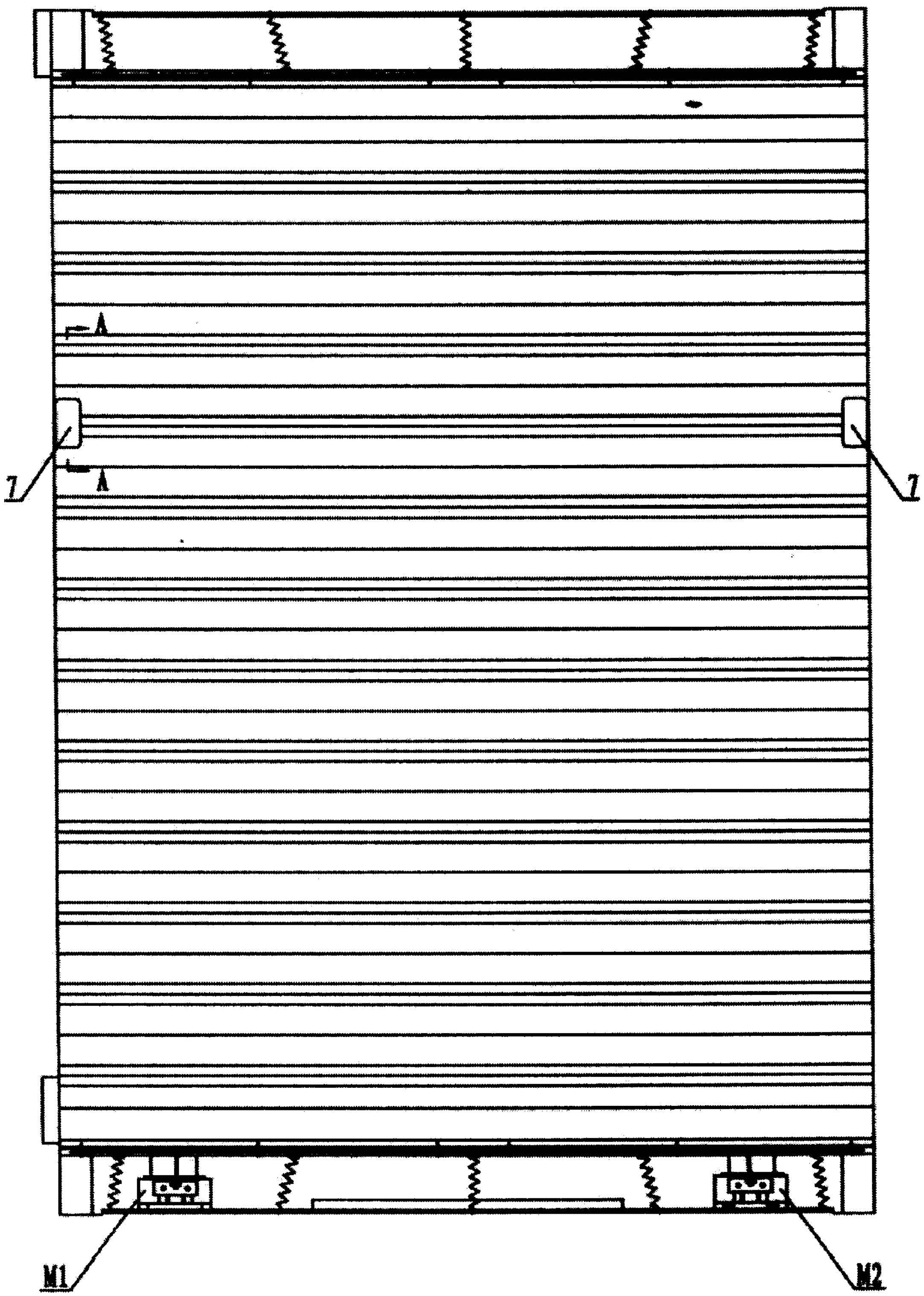
FIG. 1 is the schematic diagram of a structure of this invention.
Figure 2:
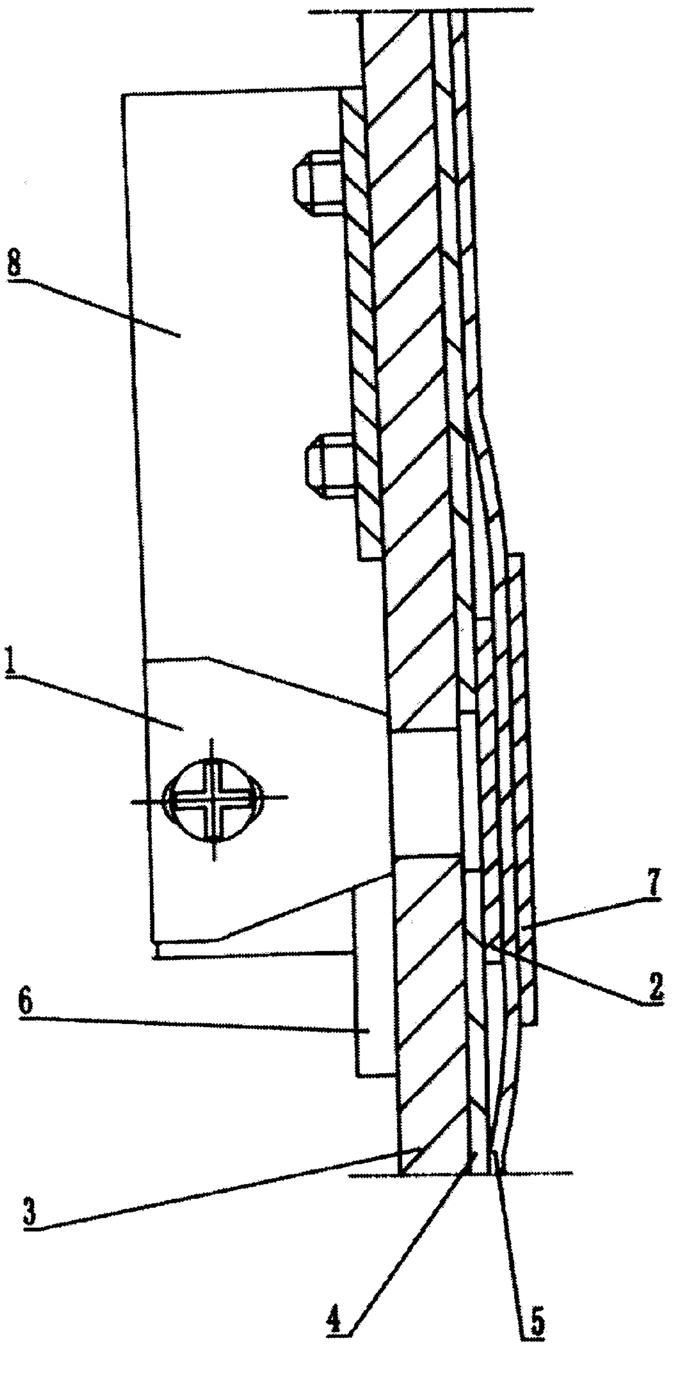
FIG. 2 is the enlarged A—A sectional view of FIG. 1 for one embodiment of the installation location of the photoelectric sensor and the reflecting chip.
Figure 3:
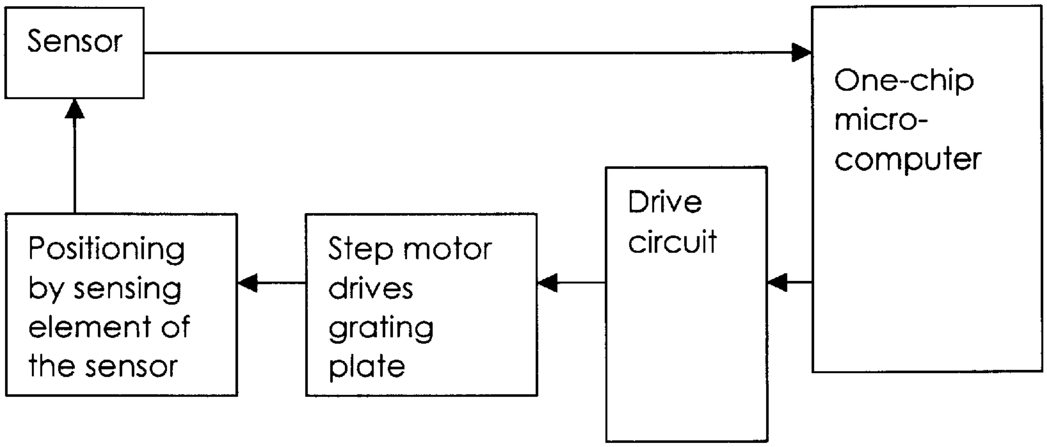
FIG. 3 is the operation flowchart of one embodiment of this invention.
Figure 4:
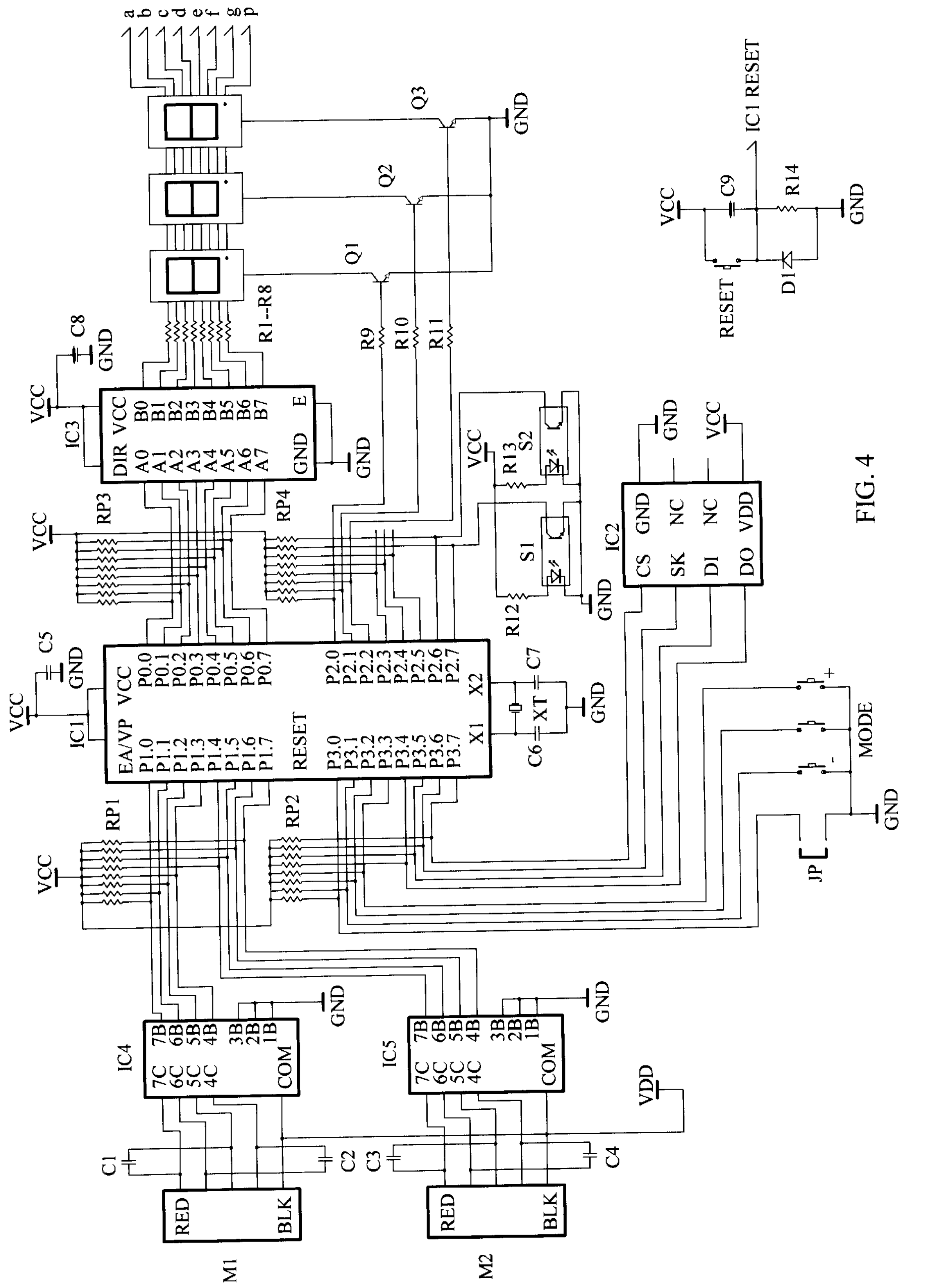
FIG. 4 is the circuit diagram of an embodiment of this invention.

As shown in FIG. 1, FIG. 2 and FIG. 3, two sets of photoelectric sensing devices are symmetrically installed in the illumination case on the left and the right. An illumination filmstrip 4 is nestled and fixed up to the front of a transparent plate 3. A grating plate 5 spreads out and nestles against the illumination filmstrip 4 by stretch springs. Two step motors M1 and M2 are connected with the grating plate 5 through the link hook. An infrared photoelectric sensor 1 supported by a holder 8 is fitted respectively on both the left side and the right side of the rear of transparent back plate 3. In addition, there are holes in the transparent back plate 3 and the illumination filmstrip 4 to let light through. A light reflecting chip 2 is fixed on the back of the grating plate 5. The infrared light emitted by the photoelectric sensor 1 projects directly onto the light reflecting chip 2 through the light through hole. A magnetic piece 6 is adhered onto the installation position of the infrared photoelectric sensor 1, and there is also a magnetic pressure piece 7 on the installation position of the light reflecting chip 2. The magnetic pressure piece 7 is bonded on the front of the grating plate 5, which makes the light reflecting piece 2 press close onto the illumination filmstrip 4, so that a constant distance to the sensor 1 is always maintained. When fitting these two sets of photoelectric sensors mentioned above, the starting point of the circular, up-and-down movement of the grating plate 5 is preset, and the fitting position of the light reflecting piece 2 on the grating plate 5 is used as the benchmark. The standard signal then is detected by the infrared photoelectric sensor 1. After one revolution of the circular, up-and-down movement of the grating plate 5, the light reflecting piece 2 fitted on the grating plate 5 returns to the benchmark, and another signal is detected by the infrared photoelectric sensor 1, which is transmitted to the control circuit for processing. The specific control circuit is shown in FIG. 4. All parameters are programmed in a type 93C46 memory IC2. A type 89C51 one-chip microcomputer IC1 reads data from the memory IC2, and gives instructions to control type ULN2003A drive modules IC4 and IC5, which then regulate two step motors M1 and M2 on the left and right respectively, so that they can drive the grating plate 5 to synchronously move circularly, and up and down. As soon as the benchmark is offset, the two sets of the infrared photoelectric sensors S1 and S2 will detect the deviation signal, which will be transmitted to the one-chip microcomputer for processing, and automatically regulate the step motor at the some side to keep the benchmark unchanged. Furthermore, the above-mentioned infrared photoelectric sensors can be replaced by supersonic sensors or magnetic sensors; correspondingly, the light reflecting pieces can be replaced by sound reflecting pieces or magnetic inductive pieces.

As a further improvement of this invention, an 89C51 one-chip microcomputer IC1 is connected externally with the display circuit, which includes a type 74HC245 seven-segment digital LED drive module IC3 and three seven-segment LEDs. Instructions are input through the external buttons, and the one-chip microcomputer IC1 sets and controls the remaining time of each picture, the changing speed of various pictures, and the step-distance of the grating plate. The actual data are displayed on the seven-segment LEDs. The one-chip microcomputer IC1 can output two synchronous control signals and a master-and-sub unit discrimination signal at its pins P2.3, P2.4 and P2.5, used for controlling the synchronous movement of two or more grating plates of the illumination case.

What is claimed is:

1. A position detection device for an illumination case comprising:

a. an illumination filmstrip, b. a grating plate, c. a transparent back plate, d. two step motors for driving the grating plate to move up and down, and e. a one-chip microcomputer, f. two sensors and g. a set of related sensing elements, wherein the illumination filmstrip overlays the transparent back plate and being fixed thereto, wherein the grating plate spreads out and nestles up to the illumination filmstrip by means of one or more stretch springs, wherein the grating plate links with the two step motors, the two sensors being fixed on a left side and a right side of the transparent back plate, respectively, wherein the sensing elements are fitted on the grating plate corresponding to the sensors and sets a starting point of a circular, up-and-down movement of the grating plate, wherein a current fixed position of the sensing element on the grating plate is taken as a benchmark and the sensors detect a reference signal, such that once the starting point of the grating plate shifts, the benchmark also shifts accordingly, and the sensors detect a deviation signal, said deviation signal being transmitted to the one-chip microcomputer for processing, whereby regulating the step motor on the same side causes the starting point of the grating plate to be led back to a preset location.

2. The device according to claim 1, wherein a magnetic piece is correspondingly fitted on the fixed position of each of said sensors or each of said sensing elements to attract each other.

3. The device according to claim 1 or claim 2, wherein the sensors are infrared photoelectric sensors, and the sensing elements are light reflecting pieces.

4. The device according to claim 1 having an external display circuit for said one-chip microcomputer, said external display circuit including a drive module for a set of seven-segment digital light emitting diodes (LEDs) and a set of three seven-segment digital LEDs, wherein a set of instructions are input through a set of external buttons, and the one-chip microcomputer sets and controls a remaining time, a moving speed, and a moving step-distance of the grating plate, and wherein the seven-segment LEDs display the remaining time, the moving speed, and the moving step-distance.

5. The device according to claim 1 or claim 4, wherein the one-chip microcomputer is adapted to output at least two synchronous control signals used for controlling a synchronous operation of two or more grating plates of the illumination case.

6. The device according to claim 1 or claim 2, wherein the sensors are supersonic sensors, and the sensing elements are sound reflecting pieces.

7. The device according to claim 1, wherein the sensors are magnetic sensors, and the sensing elements are magnetic inductive pieces.

* * * * *